United States Patent [19]

Fujioka et al.

[11] Patent Number: 4,562,503
[45] Date of Patent: Dec. 31, 1985

[54] PERPENDICULAR MAGNETIC RECORDING HEAD

[75] Inventors: Yoshiharu Fujioka, Yamato; Akio Onuki, Ichikawa; Shushi Takei, Yokohama, all of Japan

[73] Assignee: Tokyo Shibaura Denki Kabushiki Kaisha, Kawasaki, Japan

[21] Appl. No.: 515,550

[22] Filed: Jul. 20, 1983

[30] Foreign Application Priority Data

Jul. 30, 1982 [JP] Japan ............................. 57-133549

[51] Int. Cl.$^4$ ............................. G11B 5/20; G11B 5/22
[52] U.S. Cl. ................................. 360/123; 360/113; 360/122
[58] Field of Search ................................. 360/123–124, 360/113, 122, 125–127, 119, 110

[56] References Cited

U.S. PATENT DOCUMENTS 4,385,334 5/1983 Yanagida ............................. 360/125
4,443,826 4/1984 Sawada et al. ....................... 360/113

FOREIGN PATENT DOCUMENTS 2941828 4/1980 Fed. Rep. of Germany ...... 360/123

OTHER PUBLICATIONS

"Studies of Perpendicular Magnetization in Co-Cr Sputtered Films", Sep. 1980, S. Iwasaki et al., IEEE Trans. on Hag, vol. MAG16, No. 6, pp. 1111–1113.

*Primary Examiner*—Stuart N. Hecker
*Assistant Examiner*—David J. Severin
*Attorney, Agent, or Firm*—Oblon, Fisher, Spivak, McClelland & Maier

[57] ABSTRACT

A main magnetic pole member and an auxiliary magnetic pole member of a perpendicular magnetic recording head are disposed such that they are opposed to each other with a recording medium for recording a signal thereon (i.e., a magnetic tape) interposed therebetween. In the central portion of a holder of the main magnetic pole member, a magnetic pole film is embedded such that its upper end edge is exposed on a sliding contact surface of the holder. The magnetic tape is brought into sliding contact with the magnetic pole film. A pair of electrodes are embedded in such a manner as to sandwich an upper end portion of the magnetic pole film within the holder, and at positions spaced by a suitable distance from such upper end portion of the magnetic pole film. The auxiliary magnetic pole member causes the generation of a uniform magnetic flux directed from the auxiliary magnetic pole member toward the magnetic pole film. The magnetic pole film is formed of a magnetic material which has its permeability varied upon application thereto of an electric field. When a voltage is applied to the electrodes in accordance with the signal, an electric field is formed in the magnetic pole film to increase or decrease the permeability thereof, thereby causing an increase or decrease in density of the magnetic flux in the vicinity of the magnetic pole film. Thus, the magnetization of the magnetic tape is inverted or noninverted with the result that perpendicular magnetic recording of the signal is effected.

12 Claims, 8 Drawing Figures

PERPENDICULAR MAGNETIC RECORDING HEAD

BACKGROUND OF THE INVENTION

The present invention relates to a perpendicular magnetic recording head which, by preventing the occurrence of cross-talk between channels, is capable of increasing the density of tracks.

High density recording has recently been demanded in magnetic recording techniques. For this reason, perpendicular magnetic recording is receiving a great deal of attention as opposed to conventional longitudinal-direction magnetic recording. In a perpendicular magnetic recording system, the magnetic medium is magnetized in a direction perpendicular to its surface, thereby achieving high density recording.

Further, pulse-code modulation (abbreviated hereinafter as PCM) records by converting a voice or picture into a digital code. Since this PCM recording offers a high S/N ratio, and therefore, a recording of high quality, it has been widely used in recent years. In the above-mentioned recordings of high density and of high quality, if the track of a recording medium is multichannelled and simultaneous recording is effected with respect to each channel, it will possible to effect a recording of higher density as well as of higher quality.

A prior art perpendicular magnetic recording head is arranged such that, as shown in FIG. 1, a main magnetic pole member 12 and an auxiliary magnetic pole member 14 are disposed with a magnetic tape 10, constituting a recording medium, interposed therebetween. The main magnetic pole member 12 has a thin film formed of magnetic material of high permeability and its tip end portion slidably contacts a recording surface of the magnetic tape 10. The auxiliary magnetic pole member 14 is formed of magnetic material of high permeability and is wound with an exciting coil 16. When a signal current is applied to the exciting coil 16, a magnetic field corresponding to the signal current is generated from the auxiliary magnetic pole member 14 to be foucused onto the tip end portion of the main magnetic pole member 12. Due to this magnetic field, a residual magnetization is produced in a direction perpendicular to the magnetic tape 10, and the signal is thus recorded on the tape 10.

On the other hand, a ring-type magnetic head for used in longitudinal-direction magnetic recording is constructed such that, as shown in FIG. 2, magnetic cores 18 and 20 oppose each other in such a manner as to assume the shape of a pair of opposing capital letters C's, and gap 22 is created between the opposed face of one side. When a signal current is allowed to pass through an exciting coil 24 wound around the cores 18 and 20, a closed magnetic circuit is formed within each of the cores 18 and 20. As a result, a residual magnetization is produced, due to the action of a magnetic flux leaked from the gap 22, in a direction perpendicular of the surface of the magnetic tape 10, whereby the signal is recorded thereon.

In this ring type magnetic head, since the magnetic flux is not leaked except in the area of the gap 22, multi-channelling would not cause the crosstalk between the channels to have any substantial effect upon the recording characteristics. However, since the perpendicular magnetic recording head has an open magnetic circuit formed between the main magnetic pole member 12 and the auxiliary magnetic pole member 14, the following drawback occurs when, as shown in FIG. 3, a number of magnetic heads are juxtaposed with each other for multichannelling arrangement. That is, the magnetic flux generated from one main magnetic pole member 12 or one auxiliary magnetic pole member 14 enters the adjacent main magnetic pole member or auxiliary magnetic pole member, as indicated in FIG. 3 by broken lines. This entry of the magnetic flux causes the occurrence of crosstalk between the channels, thereby deteriorating the recording characteristic of each head. In the prior art perpendicular magnetic recording head it therebecomes difficult to effect multichannelling.

Further, the width of the main magnetic pole member 12 is substantially equal to the width T of a track. On the other hand, the width W of the auxiliary magnetic pole member 14 is preferably several times greater than the width T of a track. Further, it is necessary to provide an interspace between the auxiliary magnetic pole members 14 which is large enough to permit the exciting coil 16 to be wound therearound. For this reason, it is impossible to make the pitch P between the tracks small owing to restraints upon the shape and structure of the auxiliary magnetic pole member 14, resulting in a drawback that the prior art perpendicular magnetic recording head fails to increase the density of the track.

SUMMARY OF THE INVENTION

An object of the invention is to provide a perpendicular magnetic recording head which is capable of realizing multichannelling without causing any deterioration of its recording characteristics due to crosstalk between the channels.

Another object of the invention is to provide a perpendicular magnetic recording head which is capable of increasing the density of tracks.

Still another object of the invention is to provide a perpendicular magnetic recording head which can be embodied into a helical-scan type rotary magnetic head.

According to the present invention, there is provided a perpendicular magnetic recording head for recording a signal on a recording medium, which is provided with a main magnetic pole means and an auxiliary magnetic pole means. The main magnetic pole means and the auxiliary magnetic pole means are opposed to each other with the recording medium interposed therebetween. The main magnetic pole means has a magnetic pole film formed of magnetic material whose permeability varies when it is applied with an electric field, and an electrode means which can cause an electric field to be formed in the magnetic pole film. The auxiliary magnetic pole means can cause a magnetic field to be formed between this auxiliary magnetic pole means and the magnetic pole film.

According to another embodiment of the invention, the main magnetic pole means has a magnetic pole film formed of magnetic material whose permeability varies when it is subjected to distortion, a piezoelectric element capable of causing a distortion to be applied to the magnetic pole film by application thereto of an electric field, and an electrode means capable of causing an electric field to be formed in the piezoelectric element.

According to the invention, the auxiliary magnetic pole means is sufficient if it generates a specified magnetic flux. When an electric field is applied to the magnetic pole film of the main magnetic pole means, the permeability thereof is increased or decreased and the density of the magnetic flux in the vicinity of the magnetic pole film is thereby increased or decreased respectively, whereby the magnetization of the recording medium is inverted or noninverted. Or alternatively, when an electric field is applied to the piezoelectric element of the main magnetic pole means, the piezoelectric element causes a distortion, thereby causing a distortion in the magnetic pole film. By producing this distortion, the permeability of the magnetic pole film is increased or decreased, with the result that the density of the magnetic flux in the vicinity of the film is increased or decreased respectively, whereby the magnetization of the recording medium is inverted or noninverted. In this way, the invention achieves perpendicular magnetic recording by the use of a system which is different from the above-mentioned prior art system, that is, by permitting a signal to be recorded in the recording medium through the change of the focusing of the magnetic flux by the main magnetic pole means itself.

For the above-mentioned reason, it is impossible for any crosstalk between the channels to occur due to the turning of the magnetic flux from one head to an adjacent head. According to the invention, therefore, it is also possible to shorten the interval between adjacent heads with respect to the perpendicular magnetic recording system which must have an open magnetic circuit. Further, according to the invention, there is no need to provide the auxiliary magnetic pole means with respect to each channel and it is possible to use a single auxiliary magnetic pole means with respect to all channels. Consequently, unlike the prior art magnetic head, the magnetic head of this invention is freed from any restraints upon the shape and structure of the auxiliary magnetic pole means. According to the invention, therefore, it is possible to shorten the pitch between the channels, thereby increasing the track density. Further according to the invention, there is no need to maintain the positional relation between the main magnetic pole means and auxiliary magnetic pole means at a specified position. Consequently, it is possible to move the main magnetic pole means independently. This then makes it possible to effect perpendicular magnetic recording based on the use of the helical-scan type rotary magnetic head.

DETAILED DESCRIPTION OF THE PREFERRED EMBODIMENTS

Figure 4:
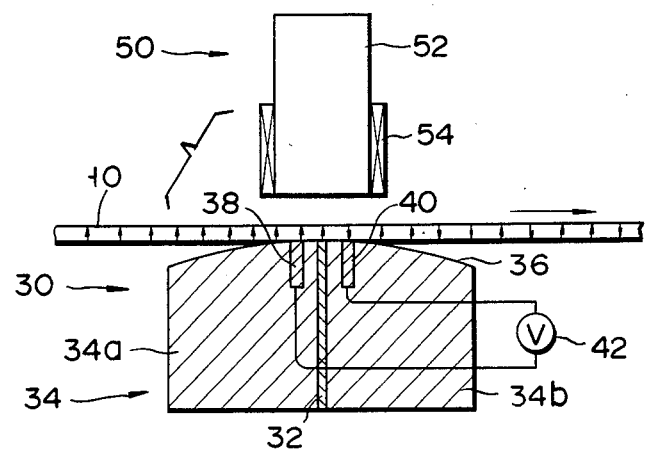
FIG. 4 is a side view showing a perpendicular magnetic recording head according to an embodiment of the invention.

Referring now to the drawings, wherein like reference numerals designate identical or corresponding parts throughout the several views, and more particularly to FIG. 4, where there is shown a perpendicular magnetic recording head according to an embodiment of the invention. The perpendicular magnetic recording head has a main magnetic pole member 30 and auxiliary magnetic pole member 50 which are disposed such that they are opposed to each other with a magnetic tape 10, constituting a recording medium, interposed therebetween. The magnetic tape 10 is magnetized uniformly in the direction opposed to the direction of a magnetic flux of the auxiliary magnetic pole member 50 by, for example, an erasing head. A non-magnetic holder 34 of the main magnetic pole member 30 has a pair of halved holder pieces 34a and 34b arranged along the magnetic tape 10 in the advancing direction thereof (indicated in FIG. 4 by an arrow). A magnetic pole film 32 consisting of magnetic material of high permeability is interposed between the holder pieces 34a and 34b. The magnetic pole film 32 is formed of a magnetic material, such as bismuth manganate ($BiMnO_3$) a piezoelectric effect and an inverse effect of magnetostriction, which has its permeability varied upon the production of this distortion by the application of an electric field, or is formed of a magnetic material, such as nickel boracite ($Ni_3B_7O_3I$) having a magnetoelectric effect, which has its permeability varied by inversion of its magnetization due to the application of an electric field. The joining faces of the holder pieces 34a and 34b are made flat and a magnetic pole film 32 is formed, by deposition or sputtering, on one of said joining faces at the center of the width direction thereof. With this magnetic pole film 32 sandwiched in between, the two holder pieces 34a and 34b are adhered to each other by means of an adhesive such as a glass bonding agent. A surface 36 of the holder 34 brought into sliding contact with the magnetic tape 10 is curved in the advancing direction of the magnetic tape 10 so that the tape 10 may be brought smoothly into sliding contact with the holder 34. The upper end edge of the magnetic pole film 32 is exposed on the sliding-contact surface 32 so that the magnetic tape 10 and the magnetic pole film 32 may enjoy sliding contact with each other.

A pair of electrodes 38 and 40 consisting of conductive material are embedded in the holder pieces 34a and 34b, respectively. The electrodes 38 and 40 are disposed with the upper end portion of the magnetic pole film 32 sandwiched in between and they are suitably spaced apart from the magnetic pole film 32. A signal source 42, arranged to output a voltage corresponding to a signal to be recorded onto the magnetic tape 10, is connected to the electrodes 38 and 40. Accordingly, an electric field corresponding to the recording signal is formed, by means of the signal source 42, between the electrodes 38 and 40. This electric field is applied to the upper end portion of the magnetic pole film 32, so that the permeability of the film 32 varies due to the piezoelectric effect and the inverse effect of magnetostriction or due to the magnetoelectric effect.

The auxiliary magnetic pole member 50 has a magnetic member 52 of high permeability and an exciting coil 54 wound around a lower half portion of this magnetic member 52. The auxiliary magnetic pole member 50 is spaced at a suitable length from the magnetic tape 10 on the magnetic pole film 32 which is brought into sliding contact with the main magnetic pole member 30. A specified current is allowed to pass through the exciting coil 54. By passing the current through the exciting coil 54, a magnetic flux capable of inverting the magnetization of the magnetic tape 10 is generated from the auxiliary magnetic pole member 50. The auxiliary magnetic pole member 50 may use a permanent magnet capable of generating a specified magnetic flux without using the electromagnet mentioned above.

The operation of the above-constructed perpendicular magnetic recording head will now be described. From the signal source 42, a signal voltage V is applied to the electrodes 38 and 40. Then, an electric field E varying in accordance with the recording signal is formed between the electrodes 38 and 40. If the magnetic pole film 32 of the main magnetic pole member 30 is formed of magnetic material having a piezoelectric effect and an inverse effect of magnetostriction, its upper end portion or its portion neighboring upon the sliding-contact surface 36 of the holder 34 is subjected to distortion due to the piezoelectric effect caused by application of the electric field E. The permeability of the magnetic pole film 32 is varied due to the inverse effect of magnetostriction upon production therein of such a distortion. If the magnetic pole film 32 is formed of magnetic material having a magnetoelectric effect, the upper end portion of the magnetic pole film 32 is subjected, due to the magnetoelectric effect based on application of the electric field E, to inversion of the magnetization, with the result that its permeability is varied. On the other hand, a specified magnetic flux is generated from the auxiliary magnetic pole member 50 by allowing a current to pass through the exciting coil 54. The magnetic flux from the auxiliary magnetic pole member 50 is focused onto the magnetic pole film 32 of the main magnetic pole member 30 whose permeability is increased due to the application of the electric field, with the result that the density of the magnetic flux passing through the magnetic pole film 32 is increased up to a value large enough to invert the magnetization of the magnetic tape 10. Accordingly, when a voltage is applied between the electrodes 38 and 40, the magnetization of the magnetic tape 10 is inverted, and the signal from the signal source 42 is recorded onto the magnetic tape 10. On the other hand, when the signal voltage V is not applied between the electrodes 38 and 40, the electric field E is not applied to the upper end of the magnetic pole film 32, with the result that neither the piezoelectric effect and the inverse effect of magnetostriction nor the magnetoelectric effect is produced in the magnetic pole film 32. Accordingly, the magnetic flux from the auxiliary magnetic pole member 50 is not focused onto the magnetic pole film 32 and the magnetic flux density is not increased. Therefore, the magnetization of the magnetic layer of the magnetic tape 10 is not inverted, and so no signal recording occurs.

According to this invention, perpendicular magnetic recording is effected by a system which causes a specified magnetic flux to be generated from the auxiliary magnetic pole member 50, this then causes the main magnetic pole member 30 to have an increased magnetic flux which is focused efficiently when recording a signal onto the magnetic tape 10, and which causes the density of the magnetic flux to be increased so as to invert the magnetization of the magnetic tape 10. In this case, a specified magnetic flux is constantly generated from the auxiliary magnetic pole member 50 and only the magnetic flux density in the vicinity of the main magnetic pole member 30 is varied by the signal. Accordingly, where this perpendicular magnetic recording head is arranged for multichannelling, it does not suffer from the drawback that a magnetic flux turns from one head to another adjacent one causing crosstalk between the channels.

Figure 5:
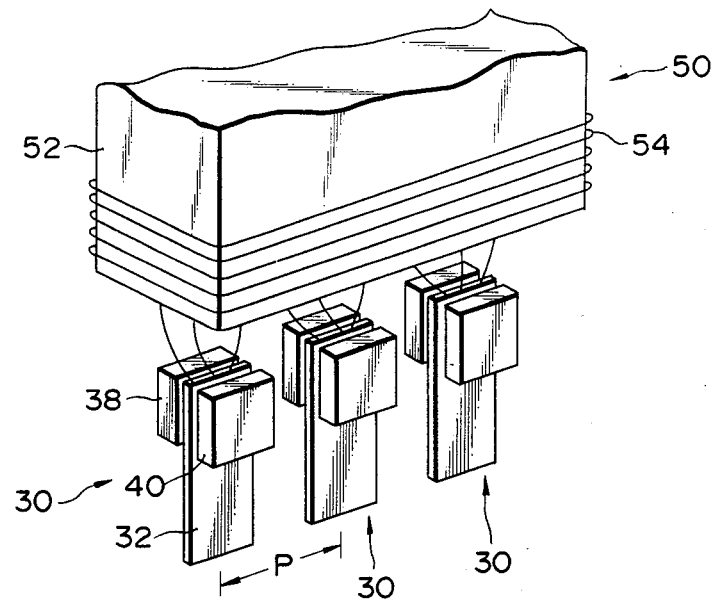
FIG. 5 is a side view showing a multichannel perpendicular magnetic recording head based on the application of the invention; of the invention.

In FIG. 5, there is shown a head assembly wherein three perpendicular magnetic recording heads according to the above-mentioned embodiment of the invention are juxtaposed to effect a three-channel recording. The same parts as those of FIG. 4 are denoted by like reference notations and only the magnetic pole film 32 and electrodes 38 and 40 are shown with respect to the main magnetic pole members 30. The main magnetic pole members 30 are arranged at pitches P in a direction intersecting the running direction of the magnetic tape (not shown) at right angles thereto. The width of the magnetic pole film 32 of each main magnetic pole member 30 is substantially equal to the width of a recording channel of the magnetic tape. The auxiliary magnetic pole member 50 has a width great enough to permit this member to oppose all the main magnetic pole members 30 and generates a uniform magnetic flux toward the main magnetic pole members 30. The auxiliary magnetic pole member 50 need not be provided with respect to the main magnetic pole member 30 of each channel, but the assembly can be arranged such that a single electromagnet or permanent magnet has the function of the auxiliary magnetic pole member which is required for each of the main magnetic pole members 30.

In the perpendicular magnetic recording system according to this invention, no crosstalk occurs between the channels due to the turning of the magnetic field from one head to another. The fact that the magnetic circuit in the head is open does not have any undesirable effect upon the recording characteristics of this system. Accordingly, it is possible to shorten the distance between the main magnetic pole members 30. On the other hand, since, as mentioned above, the auxiliary magnetic pole member 50 is not required for each channel, no limitation is imposed upon the dimension or configuration of the auxiliary magnetic pole member 50, unlike prior art system, and it is therefore possible to reduce the pitch P of arrangement between the main magnetic pole members. Accordingly, it is a simple matter to increase the density of the recording tracks and to multichannel the tracks.

Figure 6:
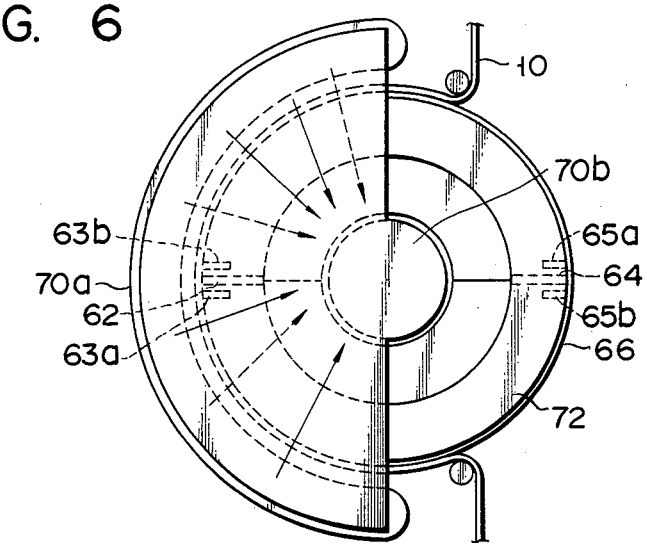
FIG. 6 is a plan view showing a rotary type perpendicular magnetic recording head according to another embodiment of the invention.
Figure 7:
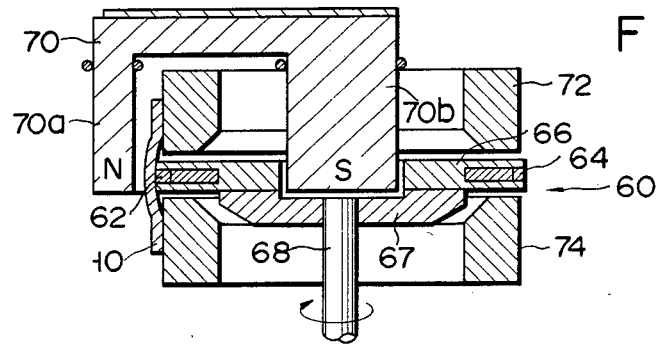
FIG. 7 is a side sectional view showing the rotary type perpendicular magnetic recording head.

FIGS. 6 and 7 show the perpendicular magnetic recording head according to another embodiment of this invention which is a helical-scan type rotary magnetic head which is used in, for example, a video tape recorder. Fig. 6 is a plan view thereof and FIG. 7 is a side view thereof. As seen, the main magnetic pole member 60 is disposed between an upper cylinder 72 and a lower cylinder 74. The main magnetic pole member 60 has a rotary member 66 consisting of a circular non-magnetic material and a pair of magnetic pole films 62 and 64 provided on those portions of the rotary member 66 which exist on the peripheral edge thereof located on a straight line passing through a center of the rotary member 66. The rotary member 66 is halved into two semi-circular parts, and the magnetic pole films 62 and 64 are formed, by deposition or sputtering, on the joining surface of one of the halved rotary-member pieces, and are located in the vicinity of the peripheral edge of this one piece. The pair of halved rotary-member pieces are joined together by means of an adhesive such as, for example, a glass bonding agent, in a state wherein the magnetic pole films 62 and 64 are interposed therebetween. A pair of electrodes 63a and 63b and a pair of electrodes 65a and 65b are embedded within the rotary member 66 with the magnetic pole films 62 and 64 existing in between and at the positions spaced a suitable length from the magnetic pole films 62 and 64, respectively. The rotary member 66 is fixed onto a supporting bed 67 at its center position. A rotary shaft 68 is mounted on the supporting bed 67 so that its upper end may abut against the central position of the rotary member 66 and so that it may intersect the rotary member 66 at right angles thereto. Through a rotation of the rotary shaft 68, the rotary member 66 is allowed to rotate concentrically with the upper and lower cylinders 72 and 74. The peripheral edge of the rotary member 66 is allowed to radially project slightly from the circumferential surface of the cylinder 72 and 74. The magnetic tape 10 is allowed to travel helically and to move on the circumferential surface of the cylinders 72 and 74. The rotary member 66 of the main magnetic pole member 60 is driven to rotate at a circumferential velocity higher than the travel speed of the magnetic tape 10. The magnetic pole films 62 and 64 are allowed to move relatively while they are in sliding contact with the mangetic tape 10.

The auxiliary magnetic pole member 70 is a permanent magnet having an N pole section 70a and an S pole section 70b. The S pole section 70b takes, for example, a columnar shape and is disposed in a bore formed at the central portion or the rotary member 66. The N pole section 70a is curved in such a manner that it assumes the arc of a circle having, for example, the S pole section 70b as its center, and is disposed such that it extends around the circumference of the semi-circular part of the rotary member 66 and at a position spaced at a suitable distance, from this circumference.

In such a helical-scan type rotary magnetic head, a uniform magnetic field is radially formed from the N pole section 70A of the auxiliary magnetic pole member 70 to the S pole section 70b thereof. The magnetic tape 10 is allowed to travel helically on the circumferential surface of the upper and lower cylinders 72 and 74, and the rotary member 66 of the main magnetic pole member 60 is allowed to rotate at a circumferential velocity higher than the speed of travel of the magnetic tape 10. When a voltage corresponding to the recording signal is applied from the signal source 42 (see FIG. 4) to the paired electrodes 63a and 63b or paired electrodes 65a and 65b, an electric field is formed in the magnetic pole film 62 or 64 respectively. When the electric field is applied to the magnetic pole film 62 or 64, permeability of the film is increased due to its piezoelectric effect and inverse effect of magnetostriction or due to the magnetoelectric effect, with the result that the magnetic flux from the auxiliary magnetic pole member 70 is focused onto the magnetic pole film 62 or 64. Thus, the density of the magnetic flux passing through the magnetic pole film 62 or 64 is increased, the magnetic tape 10 at this position is subjected to magnetization inversion, and the signal is thus recorded onto the tape 10 by way of perpendicular magnetic recording.

Figure 1:
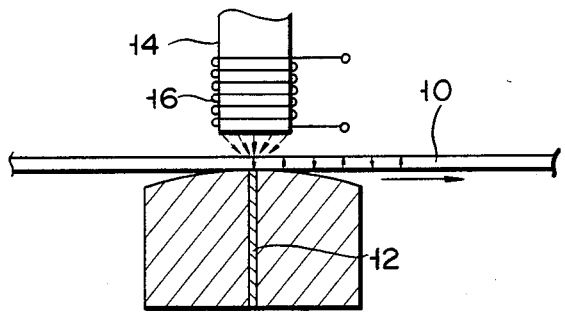
FIG. 1 is a side view showing a conventional perpendicular magnetic recording head.
Figure 2:
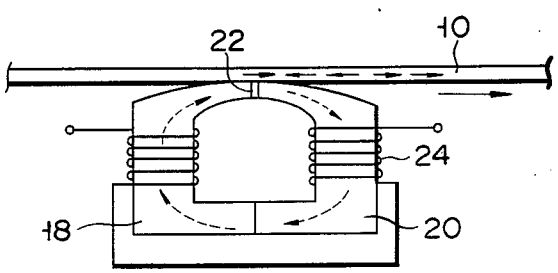
FIG. 2 is a side view showing a ring-type magnetic head of the prior art.
Figure 3:
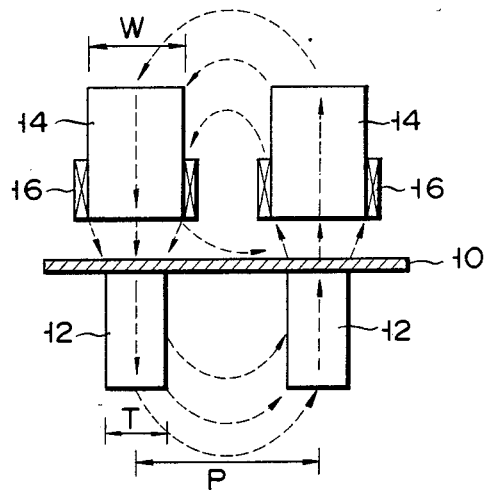
FIG. 3 is a side view showing a conventional multichannel-type perpendicular magnetic recording head.

In the prior art perpendicular magnetic recording head, the main magnetic pole member 12 and the auxiliary magnetic pole member 14, as shown in FIG. 1, must be maintained in a specific fixed positional relation at all times. For this reason, it is substantially impossible to apply the prior art perpendicular magnetic recording head to a helical-scan type rotary magnetic head such as that of a video tape recorder. In contrast, in the perpendicular magnetic recording head of the invention, the auxiliary magnetic pole member 70 is sufficient if it provides a uniform magnetic field, and thus causes a variation in magnetic flux focusing efficiency of the main magnetic pole member 60 so as to enable perpendicular magnetic recording of the signal involved. According to the invention, therefore, either the main magnetic pole member or the auxiliary magnetic pole member can be moved relative to the other with the result that it is possible to apply the perpendicular magnetic recording head to a helical-scan type rotary magnetic head device.

Figure 8:
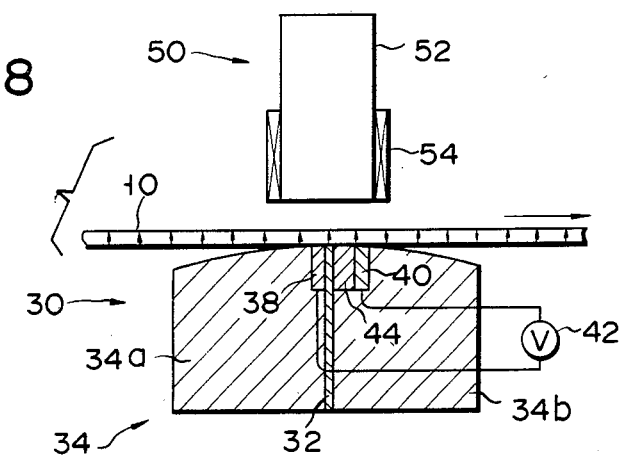
FIG. 8 is a side view showing the perpendicular magnetic recording head according to still another embodiment of the invention.

In FIG. 8, there is shown the perpendicular magnetic recording head according to still another embodiment of the invention. The same parts as those in FIG. 4 are denoted by like reference notations and a description thereof will be omitted. In this embodiment, piezoelectric element 44 is provided in contact with the magnetic pole film 32 while two electrodes 38, 40 are provided with them. That is, the magnetic pole film 32 and the piezoelectric element 44 are sandwiched between the electrodes 38 and 40. The magnetic pole film 32 is formed of a magnetic material, such as amorphous magnetic material of iron-boron (Fe-B), which has a high saturated magnetic flux density and which has a great inverse effect of magnetostriction such that its permeability is varied upon application of any distortion.

When a recording signal voltage is applied from the signal source 42 across the electrodes 38 and 40, an electric field corresponding to the recording signal is formed in the piezoelectric element 44 and the magnetic pole film 32. The piezoelectric element 44 causes a distortion therein upon application of an electric field. The position of the magnetic pole film 32 is regulated by the electrodes 38 and 40 and, when such a distortion is made in the piezoelectric element 44, there is a similar distortion in the film 32. That is, when the piezoelectric element 44 is expanded or contracted, the magnetic pole film 32 is also contracted or expanded respectively. Thus, the permeability of the magnetic pole film 32 is increased, the magnetic flux from the auxiliary magnetic pole member 50 is focused onto the magnetic pole film 32 of the main magnetic pole member 30, and the magnetization of the magnetic tape 10 is inverted, and the signal is thus recorded on the tape 10. The same effect as that obtainable with the embodiment shown in FIG. 4 is obtained with this embodiment, which makes it possible to apply the head of this embodiment to the rotary type magnetic head.

In the above-mentioned embodiments, the material of the magnetic pole film is a magnetic material whose permeability increases due to a piezoelectric effect and an inverse effect of magnetostriction or due to a magnetoelectric effect. However, the invention is not limited thereto but also permits, as the material of the magnetic pole film, the use of a magnetic material whose permeability is decreased due to a piezoelectric effect and inverse effect of magnetostriction or due to magnetoelectric effect. In this case, when a signal voltage is applied to the electrodes 38 and 40, the portion of the magnetic tape kept in contact with the magnetic pole film 32 decreases in magnetic flux density and is thus not subjected to inversion of magnetization. When a signal voltage is not applied to the electrodes 38 and 40, the magnetic flux from the auxiliary magnetic pole member 50 is focused onto the magnetic pole film 32 of the main magnetic pole member 30, and the magnetization of the magnetic tape 10 is inverted. In this way, the signal from the signal source 42 is recorded on the magnetic tape 10.

Obviously, additional modifications and variations of the present invention are possible in light of the above teachings. It is therefore to be understood that within the scope of the appended claims, the invention may be practiced otherwise than as specifically described herein.

What is claimed is:

1. A perpendicular magnetic recording head for recording a signal onto a recording medium comprising:
    a main magnetic pole means having a magnetic pole film formed of magnetic material and having the main magnetic pole means permeability varied when an electric field is applied thereto, and an electrode means being able to form an electric field in the magnetic pole film corresponding to a signal; and
    an auxiliary magnetic pole means disposed such that it opposes the main magnetic pole means with the recording medium interposed therebetween and having the capability of forming a magnetic field between the auxiliary magnetic pole means and the magnetic pole film.

2. The perpendicular magnetic recording head according to claim 1, wherein said magnetic pole film is formed of a magnetic material having a piezoelectric effect and inverse effect of magnetostriction.

3. The perpendicular magnetic recording head according to claim 1, wherein said magnetic pole film is formed of a magnetic material having a magnetoelectric effect.

4. The perpendicular magnetic recording head according to claim 1, wherein said auxiliary magnetic pole means has an electromagnet having a magnetic member disposed opposing the main pole means, and an exciting coil wound around the magnetic member.

5. The perpendicular magnetic recording head according to claim 1, wherein said auxiliary magnetic pole means has a permanent magnet disposed opposing the main magnetic pole means.

6. The perpendicular magnetic recording head according to claim 1, wherein said main magnetic pole means has a rotary member consisting of a circular plate-like non-magnetic material member having a sliding contact surface brought into sliding contact with the recording medium, on its circumferential surface, and a rotating means for allowing said rotary member to rotate about a center thereof; and the magnetic pole film is provided within said rotary member and is exposed on the sliding contact surface thereof so that it may make sliding contact with the recording medium.

7. The perpendicular magnetic recording head according to claim 6, wherein said electrode means has a pair of electrode embedded within said rotary member in such a manner that said pair of electrodes have the magnetic pole film interposed therebetween and are located at the positions a suitable distance from the magnetic pole film, and a signal source for applying a voltage to the electrodes in accordance with the signal.

8. The perpendicular magnetic recording head according to claim 1, wherein said main magnetic pole means has a holder formed of non-magnetic material and having a sliding contact surface which can be brought into sliding contact with the recording medium; and said magnetic pole film is provided within the holder and exposed on the sliding contact surface of the holder so that it may make sliding contact with the recording medium.

9. The perpendicular magnetic recording head according to claim 8, wherein said electrode means has a pair of electrodes embedded within the holder in such a manner that the paired electrodes have the magnetic pole film interposed therebetween and are located at positions a suitable distance from the magnetic pole film, and a signal source for supplying a voltage to the electrodes in accordance with the signal.

10. A perpendicular magnetic recording head for recording a signal onto a recording medium comprising:
    a main magnetic pole means having a magnetic pole film consisting of magnetic material and having the main magnetic pole means permeability varied when subjected to distortion, a piezoelectric element capable of causing a distortion in the magnetic pole film when the piezoelectric element is subjected to an electric field, and an electrode means capable of forming an electric field in the piezoelectric element in accordance with the signal; and
    an auxiliary magnetic pole means disposed such that it opposes the main magnetic pole means with the recording medium interposed therebetween, and having the capability of forming a magnetic field between the auxiliary magnetic pole means and the magnetic pole film.

11. The perpendicular magnetic recording head according to claim 10, wherein said main magnetic pole means has a holder formed of non-magnetic material and having a sliding contact surface which can be brought into sliding contact with the recording medium; and said magnetic pole film is provided within the holder and is exposed on the sliding contact surface of the holder so that it may make sliding contact with the recording medium.

12. The perpendicular magnetic recording head according to claim 11, wherein the piezoelectric element is embedded within the holder such that it is in contact with the magnetic pole film; and said electrode means has a pair of electrodes embedded within the holder in such manner that one of the pair of electrodes is in contact with the magnetic pole film while the other is in contact with the piezoelectric element, and a signal source for applying a voltage to the pair of electrodes in accordance with the signal.

* * * * *